April 19, 1938.　　　C. L. EASTBURG　　　2,114,976
TRUCK
Filed Nov. 25, 1935　　　3 Sheets-Sheet 1
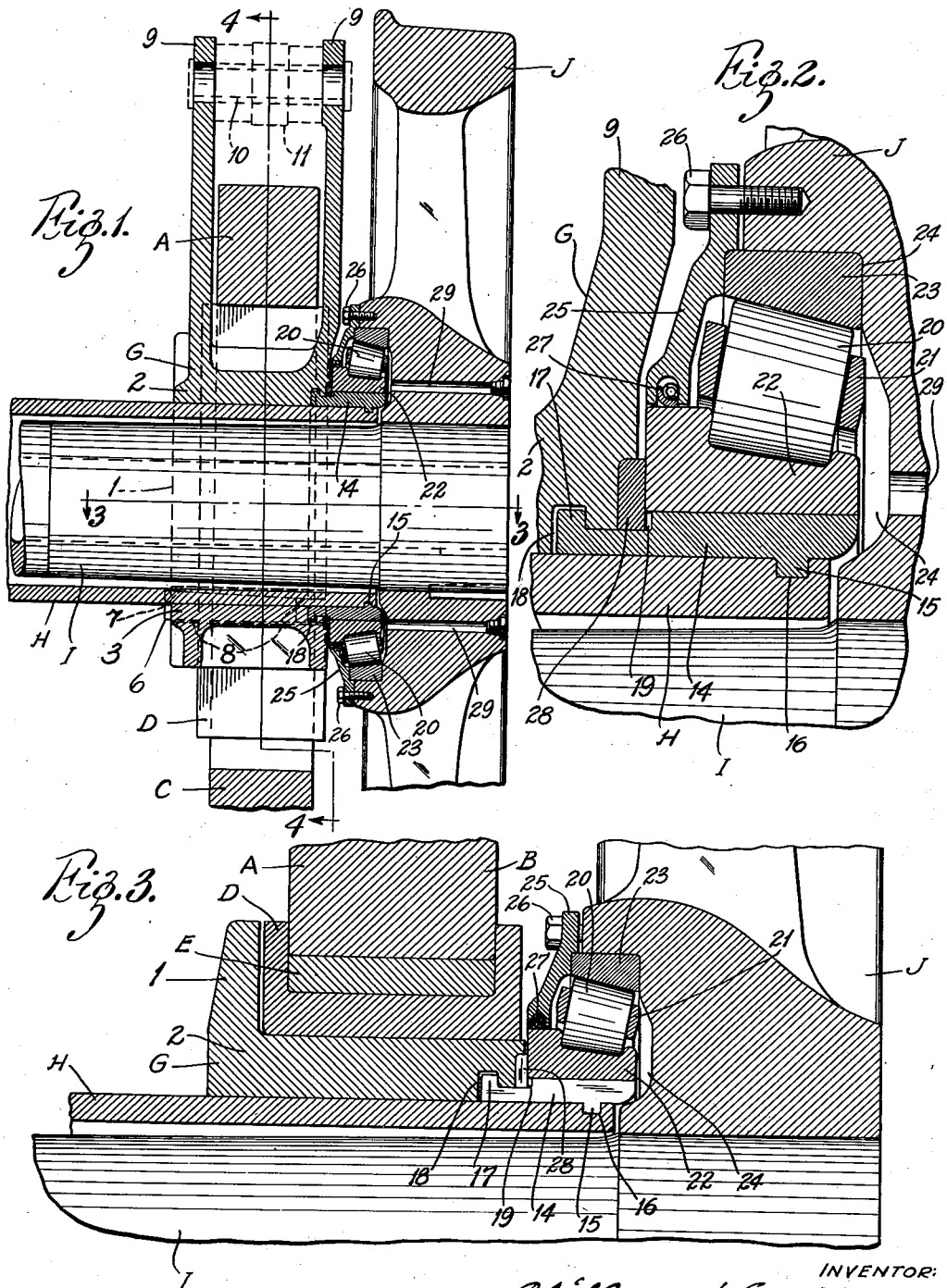

April 19, 1938.   C. L. EASTBURG   2,114,976
TRUCK
Filed Nov. 25, 1935   3 Sheets-Sheet 2
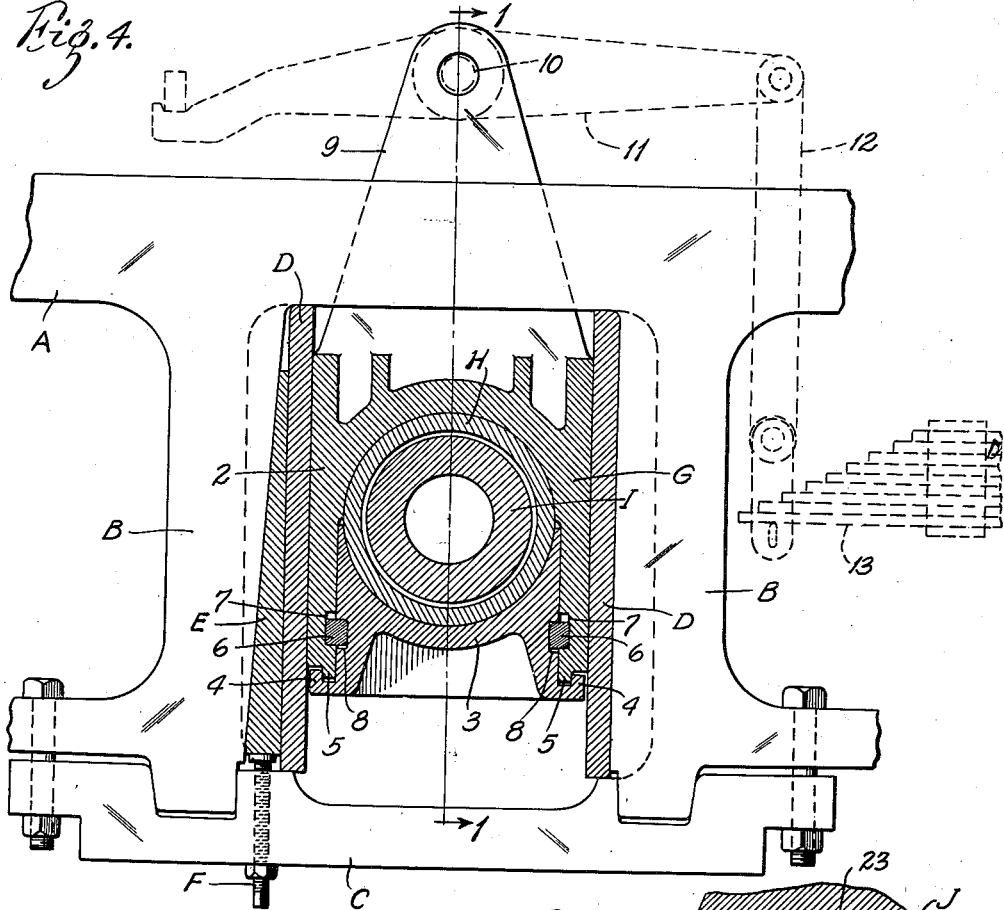
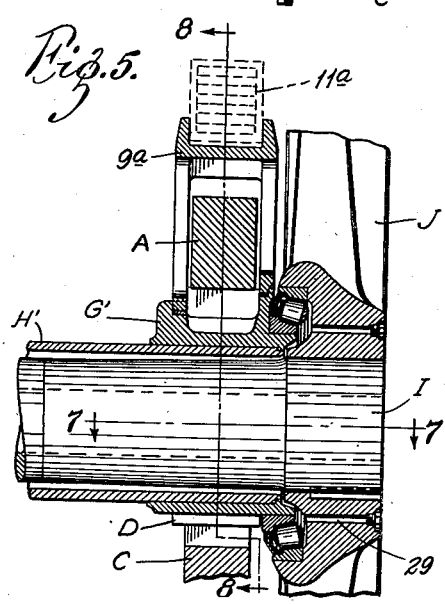
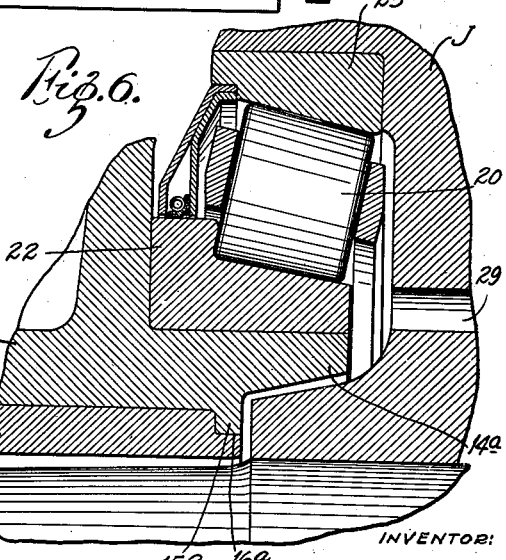
INVENTOR:
Clifford L. Eastburg
by Carrot Carruthers &c
HIS ATTORNEYS April 19, 1938.  C. L. EASTBURG  2,114,976
TRUCK
Filed Nov. 25, 1935  3 Sheets-Sheet 3

INVENTOR:
Clifford L. Eastburg
by Carnot Carnot Gravely
HIS ATTORNEYS

Patented Apr. 19, 1938

2,114,976

UNITED STATES PATENT OFFICE 2,114,976

TRUCK

Clifford L. Eastburg, Canton, Ohio, assignor to The Timken Roller Bearing Company, Canton, Ohio, a corporation of Ohio Application November 25, 1935, Serial No. 51,380

15 Claims. (Cl. 105—79)

This invention relates to trucks, particularly pedestal trucks of the kind that are used with locomotive and passenger cars and equipped with roller bearing axle constructions. The invention has for its principal objects to relieve the axle of the weight of the truck and the side thrust thereof, to permit inspection of the roller bearings without removing the wheels from the axle, to provide for adjusting the bearings and to provide for simplicity and economy of construction and compactness of design. The invention consists in the roller bearing truck axle construction and in the combinations and arrangements of parts hereinafter described and claimed.

Figure 7:
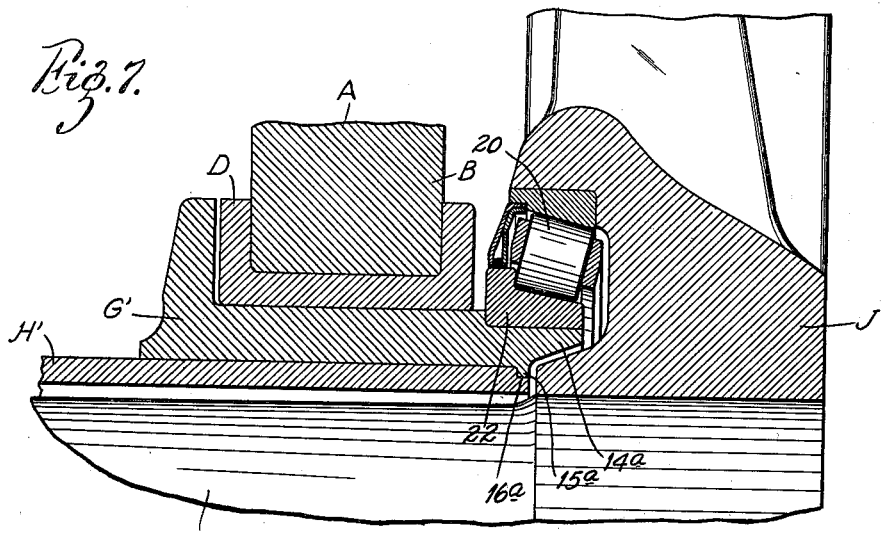
Figure 8:
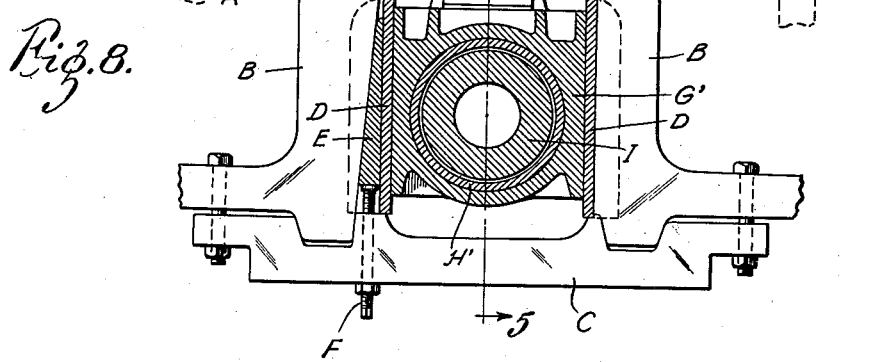

In the accompanying drawings, which form part of this specification and wherein like symbols refer to like parts wherever they occur, Fig. 1 is a vertical section through the pedestal of a railway truck and cooperating end portion of a roller bearing axle construction embodying my invention, Fig. 2 is a similar fragmentary section, showing the bearing and the parts adjacent thereto on an enlarged scale, Fig. 3 is a fragmentary horizontal section on the line 3—3 of Fig. 1, Fig. 4 is a vertical section on the line 4—4 in Fig. 1, the truck side frame being shown in side elevation, Fig. 5 is a view similar to Fig. 1, showing a modified construction, Fig. 6 is an enlarged fragmentary section similar to Fig. 5, showing the bearing and the parts adjacent thereto, Fig. 7 is a fragmentary horizontal section on the line 7—7 in Fig. 5; and Fig. 8 is a vertical section on the line 8—8 of Fig. 5, the truck side frame being shown in side elevation.

In the accompanying drawings, my invention is shown in connection with a railway truck having a side frame A provided with a pedestal B, a removable pedestal tie bar or strap C for closing the jaw of the pedestal, channel-shaped shoes D that straddle the legs of the pedestal, and an adjusting wedge E interposed between one of the pedestal legs and the shoe therefor and actuated by a bolt F that is threaded vertically through said tie bar or strap with its upper end in abutting relation to the lower end of said wedge. Located in the jaw of the truck pedestal B between the vertical guide shoes D thereof is a drive box G provided at its inner end with outstanding vertical flanges 1 that are disposed opposite the inner side flanges of the channel shaped guide shoes D in position to receive the side thrust of the truck. The drive or pedestal box G is mounted on the adjacent end of a tubular load supporting housing H that surrounds but is spaced from a live axle I that extends beyond the end of said housing and has a wheel J rigidly secured thereto outside of the truck side frame A.

As shown in Figs. 1 to 4, inclusive, of the drawings, the box comprises two vertically separable sections, an upper section 2, which snugly fits the upper half of the axle housing H and includes the guide shoe engaging sides of said box, and a lower section 3 that is slidable vertically between the lower end portions of the guide shoe engaging portions of said upper section and has its upper surface curved to fit the lower half of said axle housing. The lower side corners of the lower drive box section 3 are provided with upstanding flanges 4 that overlap depending flanges 5 at the corresponding corners of the upper drive box section 2 and serve to prevent spreading of the lower ends of the guide shoe engaging sides thereof. The two drive box sections 2 and 3 are drawn together about the axle housing H by means of wedges 6 that work in cooperating grooves 7 and 8 provided therefor in the contacting vertical faces of the respective sections. Each wedge engages the bottom of the groove 7 in the upper section 2 and the top of the groove 8 in the lower section 3, whereby said wedge, when forced longitudinally of said grooves in the direction of its small end, operates to pull the two sections together about the axle housing. As shown in Figs. 1 and 4, the upper section 2 of the drive box G has a pair of upstanding lugs or ears 9 thereon located one on each side of the truck side frame A and provided above said frame with axially alined apertures adapted to receive a pivot pin 10 for a lever 11 that has a link connection 12 with a spring 13, said lever, link and spring forming part of an equalizing mechanism for equalizing the weight on the truck axles.

Mounted on the end of the axle housing H between the drive box G and wheel J is a horizontally split sleeve 14 provided adjacent to its outer end with an internal rib or flange 15 having a snug fit in an annular groove 16 in the outer periphery of said housing, and at its inner end with an external rib 17 having a loose fit in an annular groove 18 formed in the adjacent end of the axle housing receiving bore of said drive box. The external rib 17 at the inner end of the sleeve 14 is formed by an annular groove 19 in the outer periphery of said sleeve. Interposed between the sleeve 14 and the wheel J is an antifriction bearing, preferably a taper roller bearing, whose tapered bearing rollers 20 are assembled in a suitable retaining cage 21 and are interposed between a cone or inner raceway member 22, which is mounted on said sleeve between the pedestal box H and said wheel, and a tapered cup or outer raceway member 23, which is seated in an annular recess 24 formed in the inner or box opposing face of said wheel concentric with the axis thereof. The annular space between the cone 22 and the cup 23 of said roller bearing is closed by means of an annular plate 25 which surrounds the large end of said cone and is removably secured at its outer margin to the inner face of the wheel 5 by a circular series of cap screws 26. The cup 23 extends beyond the recess 24 provided therefor in the wheel; and the end closure plate 25 bears against the projecting end of said cup thus holding the cup in said recess. The opening in said closure plate is provided with a suitable device 27 for sealing the joint between the cone and the closure member.

Interposed between the opposing ends of the drive box G and bearing cone 22 is a split ring 28 of hardened steel that seats within the annular groove 19 in the outer periphery of the split cone supporting sleeve 14. By using rings 28 of different thickness, the cone 22 may be repositioned endwise of the supporting sleeve 14 therefor to obtain a proper adjustment of the taper roller bearing. As shown in Fig. 1, an annular space is provided between the axle I and the housing H therefor which communicates at the end of said housing with the bearing receiving recess 24 in the wheel J, forming a reservoir for lubricant for the roller bearing. Such lubricant is supplied to the reservoir through one or more openings or passageways 29 that extend through the wheel from the outside face thereof to the bearing receiving recess 24 in the inner face thereof. These passageways are closed at their outer ends by threaded plugs and are disposed in line with the wheel opposing end of the bearing cone 22 for the purpose hereinafter described.

With the construction hereinbefore described, the vertical load is transmitted to the wheel through the axle housing and bearing thereon, thereby relieving the axle of such load. Fracture of the axle caused by hoop stresses and load concentration therein when the cone is pressed thereon are eliminated by mounting the cone on the axle housing. The axle is also relieved of the side thrust of the truck, such thrust being transmitted to the drive box whose thrust flange faces the direction of thrust, thence through the interlocked drive box, cone supporting sleeve and axle housing to the cone supporting sleeve at the opposite end of said axle housing, and thence through the bearing at said end of said axle housing to the wheel and through the flange thereof to the rail.

The mounting of the bearing cone on the split supporting sleeve therefor serves to hold said sleeve on the axle housing; and the split hardened steel adjusting ring serves to prevent relative endwise movement of the sleeve and the drive box and also serves as a means for obtaining the proper adjustment of a roller bearing. The driving box wedges draw the two sections of the driving box together about the axle housing and about the inner end of the cone supporting sleeve interlocked therewith. The chamber or reservoir formed by the annular space between the axle housing and axle and the bearing receiving recess in the inner face of the wheel hub may be supplied with lubricant through the passageways in the wheel hub; and the annular closure plate that is removably secured to the inside face of the wheel hub serves to prevent leakage of oil through the bearing and to retain the cup thereof in the bearing receiving recess of the wheel.

When it is desired to inspect the bearing, the drive box is dropped from the frame, the wedges removed from said box and the box removed from the housing, and the end closure plate removed from the wheel, thereby permitting a partial inspection of the bearing. A more thorough inspection of the bearing can be made by inserting rods through the passageways in the wheel and driving the cone and roller assembly inwardly along its supporting sleeve clear of said recess. During this endwise movement of the cone on the supporting sleeve therefor, the sleeve is prevented from moving with the cone by the rib-and-groove connection between the sleeve and the axle housing.

In the modified construction shown in Figs. 5 to 8, inclusive, the drive box G' is made in one piece and is provided at its wheel opposing end with an annular flange or extension 14a that supports the cone or inner raceway member of the roller bearing and is strengthened and reinforced by an internal rib 15a that seats within an annular recess 16a provided therefor in the adjacent end of the axle housing H' so as to receive the end thrust thereof. In this construction, the bearing adjustment is obtained by pressing the wheel on the axle and the wheel is removed to permit inspection of the bearing. An inverted channel-shaped saddle member 9a straddles the truck side frame with the lower ends of its side flanges supported in seats provided therefor in the top of the drive box; and the vertical load is transmitted through said saddle member to said drive box by means of a spring 11a that is supported midway of its ends in a seat provided therefor in the top of said saddle member and is pivotally connected at its ends to links 12a, said spring and links forming part of the mechanism for equalizing the weight on the axles of the truck.

Obviously, numerous changes may be made without departing from the invention. Therefore, I do not wish to be limited to the precise constructions shown.

What I claim is:

1. A truck axle construction comprising an axle, a wheel rigid therewith, a radial and end thrust bearing supported in said wheel including rollers that taper towards the outer face of said wheel, a housing for said axle, and a member externally fitting around one end of said housing and supported in said bearing, said member and said housing having interlocked annular portions adapted to transmit end thrust between said housing and said member, said member being held against axial movement with respect to said bearing, whereby end thrust is transmitted between said member and said wheel through said bearing.

2. A roller bearing railway truck axle construction comprising an axle, a wheel fixed directly on the end of said axle and having a recess in its inner face, a taper roller bearing comprising rollers that taper towards the outer face of said wheel and inner and outer raceway members, said outer raceway member being mounted in said recess, a relatively short sleeve having the greater portion of its length supported in said inner raceway member and a housing for said axle having a portion supported in said member and interlocked therewith and adapted to transmit the end thrust of said housing to said member in both directions.

3. A roller bearing railway truck axle construction comprising an axle, a wheel fixed directly thereto having a recess in its inner face, a member surrounding said axle adjacent to the inner face of said wheel and extending into the recess therein, a housing for said axle extending into said member and having a portion interlocked therewith adapted to prevent relative axial movement of said member and said housing in both directions, and a roller bearing interposed between said member and said wheel comprising an inner raceway member press-fitted on said member, an outer raceway member seated in said recess and rollers interposed between said inner and outer raceway members and tapering towards the outer face of the wheel.

4. A roller bearing truck axle construction comprising an axle, a wheel thereon, a roller bearing supported by said wheel and including an inner raceway member, a sleeve supported in and having a press fit with said inner raceway member and a housing for said axle extending into and supported by said sleeve, said sleeve and said housing having cooperating annular rib-and-groove portions adapted to transmit end thrust between said housing and said sleeve in both directions.

5. A roller bearing railway truck axle construction comprising an axle, a wheel fixed directly thereon, a roller bearing supported by said wheel and including an inner raceway member and rollers tapering towards the outer end face of said wheel, a housing for said axle, and a sleeve surrounding the adjacent end of said housing and supported in and having a press fit with said inner raceway member, said sleeve and housing being provided with interlocked portions adapted to transmit the end thrust of said housing to said sleeve in both directions.

6. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib.

7. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib, said roller bearing including an inner raceway member mounted on said split sleeve and constituting means for holding the latter on said axle housing.

8. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib, said roller bearing including an inner raceway member mounted on said split sleeve and constituting means for holding the latter on said axle housing, said wheel having an opening extending therethrough opposite said inner raceway member.

9. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib, said roller bearing including an inner raceway member mounted on said split sleeve and constituting means for holding the latter on said axle housing, said wheel having an opening extending therethrough opposite said inner raceway member, a pedestal box mounted on said housing adjacent to said sleeve and provided at the end remote from said sleeve with outstanding thrust flanges, and a split adjusting ring interposed between said box and said inner raceway member.

10. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib, said roller bearing including an inner raceway member mounted on said split sleeve and constituting means for holding the latter on said axle housing, said wheel having an opening extending therethrough opposite said inner raceway member, a pedestal box mounted on said housing adjacent to said sleeve and provided at the end remote from said sleeve with outstanding thrust flanges, and a split adjusting ring interposed between said box and said inner raceway member, the housing receiving opening in said pedestal box being provided with an annular groove and the box opposing end of said sleeve being provided with an external rib adapted to cooperate therewith.

11. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib, said roller bearing including an inner raceway member mounted on said split sleeve and constituting means for holding the latter on said axle housing, said wheel having an opening extending therethrough opposite said inner raceway member, a pedestal box mounted on said housing adjacent to said sleeve and provided at the end remote from said sleeve with outstanding thrust flanges, and a split adjusting ring interposed between said box and said inner raceway member, the housing receiving opening in said pedestal box being provided with an annular groove and the box opposing end of said sleeve being provided with an external rib adapted to cooperate therewith, said pedestal box being split horizontally to form separable sections, and wedges for drawing said sections together about said axle housing and said sleeve.

12. A roller bearing truck axle construction comprising an axle, a wheel thereon, a roller bearing supported by said wheel, a longitudinally split sleeve supported in said roller bearing and a housing for said axle extending into and supported by said sleeve, said housing supporting sleeve being provided with an internal rib and said axle housing being provided with an external groove adapted to receive said rib, said roller bearing including an inner raceway member mounted on said split sleeve and constituting means for holding the latter on said axle housing, said wheel having an opening extending therethrough opposite said inner raceway member, a pedestal box mounted on said housing adjacent to said sleeve and provided at the end remote from said sleeve with outstanding thrust flanges, and a split adjusting ring interposed between said box and said inner raceway member, the housing receiving opening in said pedestal box being provided with an annular groove and the box opposing end of said sleeve being provided with an external rib adapted to cooperate therewith, said pedestal box being provided with upstanding integral flanges adapted to support an equalizing member, said wheel having a recess in its inner face communicating with the opening in said wheel and said roller bearing including an outer raceway member seated in said recess, and a member secured to the inner face of said wheel and closing the annular space between the inner and outer raceway members of said roller bearing.

13. A roller bearing construction for a pedestal truck comprising an axle, a wheel fixed thereto, a roller bearing supported by said wheel, a longitudinally split sleeve supported by said bearing, a housing for said axle having one end supported in said sleeve, said sleeve and said housing having cooperating portions adapted to transmit the end thrust of said housing to said sleeve, and a horizontally split pedestal box mounted on said housing and having an annular rib-and-groove connection therewith.

14. A roller bearing axle construction for a pedestal truck comprising an axle, a wheel fixed thereto, a roller bearing supported by said wheel, a pedestal box supported at one end in said roller bearing, and a housing for said axle having one end supported in said pedestal box.

15. A roller bearing axle construction for a pedestal truck comprising an axle, a wheel fixed to one end thereof, a roller bearing supported by said wheel, a pedestal box having an annular end flange supported in said roller bearing, and a housing for said axle having one end extending into said pedestal box, said annular flange of said pedestal box being provided with an internal annular rib disposed in abutting relation to said end of said axle housing.

CLIFFORD L. EASTBURG.